(12) United States Patent
Asano et al.

(10) Patent No.: US 9,293,774 B2
(45) Date of Patent: Mar. 22, 2016

(54) FLUID SUPPLY SYSTEM AND METHOD OF CONTROLLING FLUID SUPPLY SYSTEM

(71) Applicant: HONDA MOTOR CO., LTD., Tokyo (JP)

(72) Inventors: Saneto Asano, Wako (JP); Koichi Takaku, Wako (JP); Koichi Kato, Wako (JP); Taneaki Miura, Wako (JP); Hiroyasu Ozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 14/062,894

(22) Filed: Oct. 25, 2013

(65) Prior Publication Data

US 2014/0116524 A1 May 1, 2014

(30) Foreign Application Priority Data

Oct. 31, 2012 (JP) ................. 2012-240109

(51) Int. Cl.
*H01M 8/04* (2006.01)
*G05B 23/00* (2006.01)
*G05D 9/00* (2006.01)
*G05B 23/02* (2006.01)

(52) U.S. Cl.
CPC ...... *H01M 8/04089* (2013.01); *H01M 8/04201* (2013.01); *H01M 8/04388* (2013.01); *H01M 8/04955* (2013.01); *G05B 23/0286* (2013.01); *H01M 2250/20* (2013.01); *Y02E 60/50* (2013.01); *Y02T 90/32* (2013.01); *Y10T 137/0379* (2015.04); *Y10T 137/7287* (2015.04)

(58) Field of Classification Search
CPC ................. H01M 8/04089; H01M 8/04388; H01M 8/04201; H01M 8/04955; H01M 2250/20; Y10T 137/7287; Y10T 137/0379; Y10T 137/8326; Y10T 137/8158; Y10T 137/8175; Y10T 137/0753; Y02T 90/32; Y02E 60/50; B67D 1/1277; B67D 1/1279; B67D 1/1281
USPC .............. 137/487.5, 12, 386, 391; 141/94, 95
See application file for complete search history.

(56) References Cited

U.S. PATENT DOCUMENTS

| | | | | |
|---|---|---|---|---|
| 5,522,428 | A * | 6/1996 | Duvall ..................... | 137/624.11 |
| 8,216,729 | B2 * | 7/2012 | Yoshida ..................... | 429/428 |
| 8,541,142 | B2 * | 9/2013 | Bono ............................ | 429/429 |
| 8,563,191 | B2 * | 10/2013 | Katano et al. ................. | 429/444 |
| 8,720,500 | B2 * | 5/2014 | Maier ........................... | 141/192 |

FOREIGN PATENT DOCUMENTS

JP 2004-152657 5/2004

* cited by examiner

*Primary Examiner* — John K Fristoe, Jr.
*Assistant Examiner* — Richard K Durden
(74) *Attorney, Agent, or Firm* — Mori & Ward, LLP

(57) ABSTRACT

A fluid supply system includes a tank, a shutoff valve, a fluid fill channel, a fluid supply channel, a fill detector, a pressure detector, and a controller. The shutoff valve includes a shared channel to enable fluid to flow from a fill hole to the tank and to flow from the tank to a fluid usage device. The pressure detector is provided in the fluid supply channel. The controller is configured to output a close instruction to the shutoff valve and configured to execute a processing to determine open valve malfunctions in the shutoff valve based on changes in pressure values which are input from the pressure detector. The controller stops the processing to determine open valve malfunctions when the fill detector detects that the fluid supply system is in the supplying state.

4 Claims, 9 Drawing Sheets

FLUID SUPPLY SYSTEM AND METHOD OF CONTROLLING FLUID SUPPLY SYSTEM

CROSS-REFERENCE TO RELATED APPLICATIONS

The present application claims priority under 35 U.S.C. §119 to Japanese Patent Application No. 2012-240109, filed Oct. 31, 2012, entitled "Fluid supply system." The contents of this application are incorporated herein by reference in their entirety.

BACKGROUND

1. Field

The present technology relates to a fluid supply system and a method of controlling the fluid supply system.

2. Description of the Related Art

A fuel cell vehicle is provisioned with, for example, a hydrogen storage tank to store hydrogen (fuel gas) at high pressure, and a normally closed shutoff valve connected to the tank that opens when filling the tank with hydrogen or supplying hydrogen from the tank.

When an open valve malfunction of the shutoff valve occurs, the supply of hydrogen is unable to be stopped which may result in a system malfunction, and so it is preferable to reliably detect open valve malfunctions. Open valve malfunctions refer to malfunctions occurring as a state in which the valve stays open despite receiving a close valve instruction.

Japanese Unexamined Patent Application Publication No. 2004-152657 discloses a state detection device provisioned with a fuel supply valve capable of shutting off the flow of fuel gas to the fuel cell, a pressure detector provisioned downstream from the fuel supply valve, and an open valve determination unit. The open valve determination unit determines that the fuel supply valve is open (that is to say, whether or not there is an open valve malfunction) on the basis of the rate of change in the pressure detected by the pressure detector at a state in which the close instruction is output to the fuel supply valve.

SUMMARY

According to one aspect of the present invention, a fluid supply system includes a tank, a shutoff valve, a fluid fill channel, a fluid supply channel, a fill detector, a pressure detector, and a controller. The tank is to store fluid that is changable in volume in accordance with change in pressure. The shutoff valve is provided in a port of the tank. The shutoff valve includes a shared channel to enable fluid to flow from a fill hole to the tank and to flow from the tank to a fluid usage device. The fluid fill channel includes one end connected to the shared channel and another end connected to the fill hole. The fluid supply channel includes one end connected to the shared channel and another end connected to the fluid usage device. The fill detector is configured to detect that the fluid supply system is in a supplying state in which fluid is to be supplied to the tank via the fluid fill channel. The pressure detector is provided in the fluid supply channel. The controller is configured to output a close instruction to the shutoff valve and configured to execute a processing to determine open valve malfunctions in the shutoff valve based on changes in pressure values which are input from the pressure detector. The controller stops the processing to determine open valve malfunctions when the fill detector detects that the fluid supply system is in the supplying state.

According to another aspect of the present invention, in a method of controlling a fluid supply system, it is detected that the fluid supply system is in a supplying state in which fluid is supplied to a tank via a fluid fill channel connecting a shared channel of a shutoff valve to a fill hole. The shared channel is to enable fluid to flow from the fill hole to the tank and to flow from the tank to a fluid usage device. Pressure is detected in a fluid supply channel connecting the shared channel to the fluid usage device. A processing to determine open valve malfunctions in the shutoff valve is executed based on changes in pressure detected in the detecting of the pressure in the fluid supply. The processing to determine open valve malfunctions is stopped when it is detected that the fluid supply system is in the supplying state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
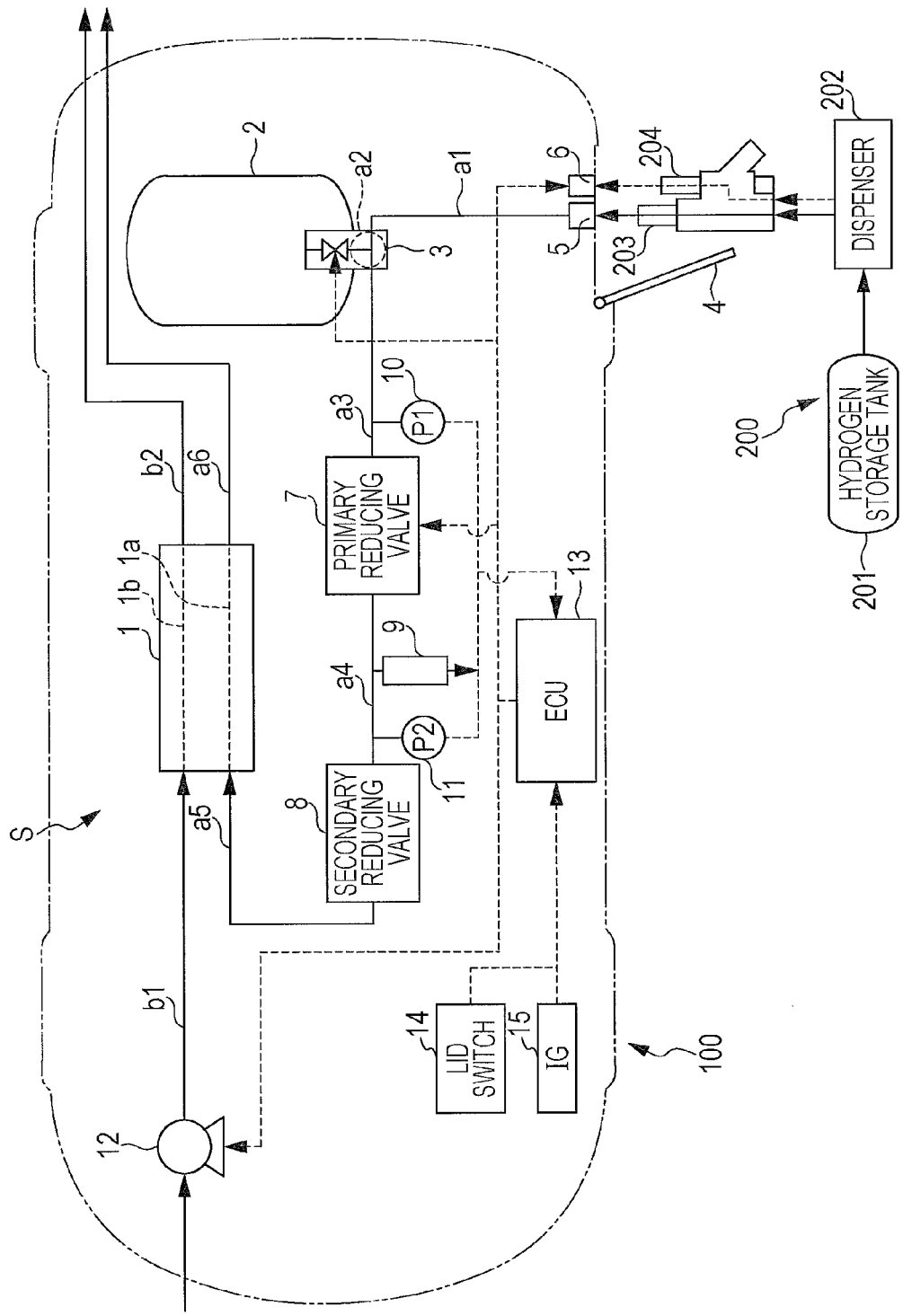
FIG. 1 is an overall configuration diagram of a fluid supply system related to a first Embodiment of the present technology.

The embodiments will now be described with reference to the accompanying drawings, wherein like reference numerals designate corresponding or identical elements throughout the various drawings.

Hereafter, a fuel cell vehicle 100 equipped with a fluid supply system S will be described as an example of the present technology, but the application of the present technology is not limited to fuel cell vehicles. For example, the present technology may be used in transportation devices such as ships or airplanes equipped with the fluid supply system S, and may also be used in stationary fluid supply systems.

First Embodiment

Configuration of Fluid Supply System

FIG. 1 is an overall configuration diagram of a fluid supply system related to a first Embodiment of the present technology. The fluid supply system S is provisioned with a fuel cell 1, a hydrogen storage tank 2, a shutoff valve 3, a primary reducing valve 7, a secondary reducing valve 8, a primary pressure sensor 10, a secondary pressure sensor 11, an electric control unit (ECU) 13, and so forth.

The fuel cell 1 (fluid usage unit) is a fuel cell stack layered with a multiple of solid polymer electrolyte single cells (not illustrated), and each single cell is electrically connected in series. The single cells are provisioned with a membrane electrode assembly (MEA), an electroconductive anode separator (not illustrated) sandwiched between the MEA, and a cathode separator (not illustrated).

Each MEA provisioned in the fuel cell 1 is provisioned with an electrolytic membrane (solid polymer electrolyte membrane) formed from a monovalent cation exchange membrane and an anode and cathode sandwiched between this. The anode and cathode is configured from a porous material having electroconductive properties, which is usually carbon paper, and includes a catalyst (platinum or other) for producing electrode reactions.

A notch and through-hole for supplying hydrogen and oxygen to the entire surface of the MEA is formed in each separator of the fuel cell 1, and these notches and through-holes function as an anode flow channel 1a and a cathode flow channel 1b. A coolant channel (not illustrated) is also formed in each separator to allow the flow of coolant (water including ethylene glycol, for example) for cooling the fuel cell 1.

When hydrogen (fluid that changes in volume under pressure) is supplied to the anode flow channel 1a, and air, which includes oxygen, is supplied to the cathode flow channel 1b, a predetermined electrode reaction occurs in the fuel cell 1, and a voltage difference (open circuit voltage, or simply OCV) is produced in each of the single cells. Then, electric current flows when the fuel cell 1 and an external load (such as a drive motor or battery) are electrically connected, which enables the electrode reaction in the fuel cell 1 to continue occurring.

The hydrogen storage tank 2 (tank) is formed by aluminum alloy or high-density polyethylene resin, and includes an airproof liner (not illustrated) for storing hydrogen gas within the tank. The perimeter of the liner is formed so as to be covered with a highly pressure-resistant shell (not illustrated) formed from carbon fiber reinforced plastics (CFRP). The hydrogen storage tank 2 stores high-grade hydrogen (fluid) at high pressure.

The shutoff valve 3 (main stop valve) is a normally closed in-tank electromagnetic valve, for example, and is installed in the port (not illustrated) of the hydrogen storage tank 2. A shared flow channel a2 is formed in the valve housing of the shutoff valve 3 (not illustrated) to allow hydrogen to flow when filling the hydrogen storage tank 2 with hydrogen from the fill hole 5 illustrated in FIG. 1 and when supplying hydrogen from the hydrogen storage tank 2 to the fuel cell 1.

Hereafter, an example configuration and operation of the shutoff valve 3 will be described. The shutoff valve 3 is configured with a provisioning of a valve housing (not illustrated), an on-off valve body (not illustrated), a solenoid (not illustrated), a coil spring (not illustrated, and other parts.

The valve housing is formed with a screw notch in the outer surface, which enables the valve housing to be installed to the hydrogen storage tank 2 lining up this screw notch with a screw notch formed in the interior surface of the port in the hydrogen storage tank 2. The shared flow channel a2 is also formed in the valve housing.

The on-off valve body closes off the connection between the shared flow channel a2 and the filling chamber of the hydrogen storage tank 2 by anchoring into the valve seat (not illustrated) formed in the interior of the valve housing. The on-off valve body connects the shared flow channel a2 and the filling chamber of the hydrogen storage tank 2 by separating from the valve seat.

The solenoid generates the drive power to open the on-off valve body, and is configured from a provisioning of a plunger (not illustrated), an electromagnetic coil (not illustrated), and other parts.

The coil spring generates a predetermined pressing force to close the on-off valve body. The pressing force of the coil spring is set so that the on-off valve body closes when the filling chamber of the hydrogen storage tank 2 reaches a fill target pressure. Note however, that this configuration of the shutoff valve 3 is only an example, and the present technology is not limited thusly.

When filling the tank with hydrogen, hydrogen flows through a fluid fill channel and the shared flow channel a2 into the hydrogen storage tank 2. The fluid fill channel is configured having a pipe a1 illustrated in FIG. 1, in which one end connects to the shared flow channel a2, and the other end connects to a fill hole 5. When the hydrogen pressure applied in this case overcomes the pressing force of the coil spring (not illustrated) provisioned to the shutoff valve 3, the on-off valve body (not illustrated) opens and allows hydrogen to fill the tank.

The hydrogen pressure applied to the on-off valve body (not illustrated) during the filling of hydrogen into the tank is also applied to the primary reducing valve 7 via the shared flow channel a2 and the fluid supply channel. The fluid supply channel is configured having pipes a3 through a5 illustrated in FIG. 1, in which one end is connected to the shared flow channel a2 and the other end is connected to the anode flow channel 1a in the fuel cell 1.

Conversely, when the hydrogen is supplied from the hydrogen storage tank 2 to the fuel cell 1, the solenoid (not illustrated) is excited by an open valve instruction input from the ECU 13, and the on-off valve body opens. Afterwards, when the close valve instruction is input from the ECU 13, the on-off valve body is closed by the pressing force of the coil spring.

A fuel lid 4 (lid member) is a rotatable lid that opens when filling the tank with hydrogen, and is installed on the side of the fuel cell vehicle 100. The fuel lid 4 is locked in a closed state to cover the fill hole 5 during normal operation (not filling the tank with hydrogen). Conversely, when a lid switch 14 is depressed to fill the tank with hydrogen, the fuel lid 4 rotates to the open position (unlocked, a supplying state of the fluid supply system) in accordance with the instruction from the ECU 13.

An interface 6 is a unit that connects with a communications connector 204 of a hydrogen station 200 when filling the tank with hydrogen, and is installed near the fill hole 5.

The primary reducing valve 7 includes a function to lower the pressure of the high pressure hydrogen supplied from the hydrogen storage tank 2 to a predetermined pressure, and is connected to the shared flow channel a2 of the shutoff valve 3 via the pipe a3. The primary reducing valve 7 is preferably provisioned with a shutoff function (cutoff function) in addition to the pressure reduction function. As a result, the flow of hydrogen downstream farther than the primary reducing valve 7 when filling the tank with hydrogen may be cut off even without the installation of an additional shutoff valve 3 having this function.

The secondary reducing valve 8 further lowers the pressure of the hydrogen in which the pressure was lowered by the primary reducing valve 7 to a predetermined pressure so that the hydrogen may be supplied to the fuel cell 1. The upstream of the secondary reducing valve 8 is connected to the primary reducing valve 7 via the pipe a4, and the downstream is connected to the anode flow channel 1a of the fuel cell 1 via the pipe a5.

A relief valve 9 is connected to the pipe a4, which is configured to open when a pressure higher than the normal pressure between the primary reducing valve 7 and the secondary reducing valve 8 (intermediate pressure line) is applied.

The primary pressure sensor 10 (pressure detecting unit) is set in the pipe a3 connecting the shared flow channel a2 in the shutoff valve 3 and the primary reducing valve 7, and detects the hydrogen pressure in the pipe a3. The primary pressure sensor 10 outputs the detected hydrogen pressure to the ECU 13.

The secondary pressure sensor 11 (pressure detection unit) is set in the pipe a4 connecting the primary reducing valve 7 and the secondary reducing valve 8, and detects the hydrogen pressure in the pipe a4. The secondary pressure sensor 11 outputs the detected hydrogen pressure to the ECU 13.

In order from the upstream, a compressor 12 which takes in air, a humidifier (not illustrated), and other parts are provisioned in a pipe b1 connected to the upstream of the cathode flow channel 1b. In order from the upstream, a back pressure valve (not illustrated) which controls the pressure inside the cathode flow channel 1b, a diluter (not illustrated), and other parts are provisioned in a pipe b2 connected to the downstream of the cathode flow channel 1b.

A purge valve (not illustrated) for draining hydrogen including impurities, etc. flowing from the anode flow channel 1a, and other parts are provisioned to a pipe a6 connected to the downstream of the anode flow channel 1a, and this downstream is connected to the diluter.

The ECU 13 (fill detection unit and control unit) is configured with the provisioning of a central processing unit (CPU), a read only memory (ROM), a random access memory (RAM), and electrical circuits functioning as various interfaces, and the ECU 13 achieves various functions in accordance with a program stored internally.

The ECU 13 executes a fill communication with a dispenser 202 provisioned to the exterior hydrogen station 200 when filling the hydrogen storage tank 2 with hydrogen. The ECU 13 starts the fill communication when the lid switch 14 is depressed (that is to say, when the fuel lid 4 is opened), for example, and sends information such as the pressure and temperature inside the hydrogen storage tank 2 to the dispenser 202 via the interface 6.

When an off signal is input from an ignition switch (IG) 15, the ECU executes a processing to determine open valve malfunctions in the shutoff valve 3. As previously described, an open valve malfunction represents a malfunction in which the valve body stays open despite the input of the close valve instruction. Details on this processing will be described later.

The lid switch 14 (filling detection unit) is a switch which is depressed when the fuel lid 4 is open, and is provisioned near the driver's seat. When the lid switch 14 is depressed, an open signal is output from the ECU 13.

The IG 15 is a start switch in the fuel cell vehicle 100, and is disposed near the driver's seat. The IG 15 outputs an on/off signal to the ECU 13.

Though not illustrated in FIG. 1, the fluid supply system S is provisioned with other parts such as a voltage control unit (VCU) to control the charging and discharging of the battery (not illustrated) and electrical power generation of the fuel cell 1, a power drive unit (PDU) to convert AC input from the VCU into 3-phase DC, and an external load (drive motor, battery) connected to the PDU.

Next, the hydrogen station 200 which supplies hydrogen as fuel gas to the fuel cell vehicle 100 will be briefly described. The hydrogen station 200 is provisioned with a hydrogen storage tank 201, the dispenser 202, a nozzle 203, and the communication connector 204. The hydrogen used to supply the fuel cell vehicle 100 is stored at high pressure in the hydrogen storage tank 201. The dispenser 202 is connected to the hydrogen storage tank 201 and controls the pressure and flow rate of hydrogen filling the hydrogen storage tank 2 while executing the fill communication with the ECU 13.

The nozzle 203 is connected to the hydrogen storage tank 201 via the dispenser 202, and is inserted into the fill hole 5 when filling the hydrogen storage tank 2 with hydrogen. The communication connector 204 is a fitting for connecting wiring and is connected to the dispenser 202. The communication connector 204 is inserted into the interface 6 when filling the hydrogen storage tank 2 in the fuel cell vehicle 100 with hydrogen.

Operation of the Fluid Supply System

Figure 2:
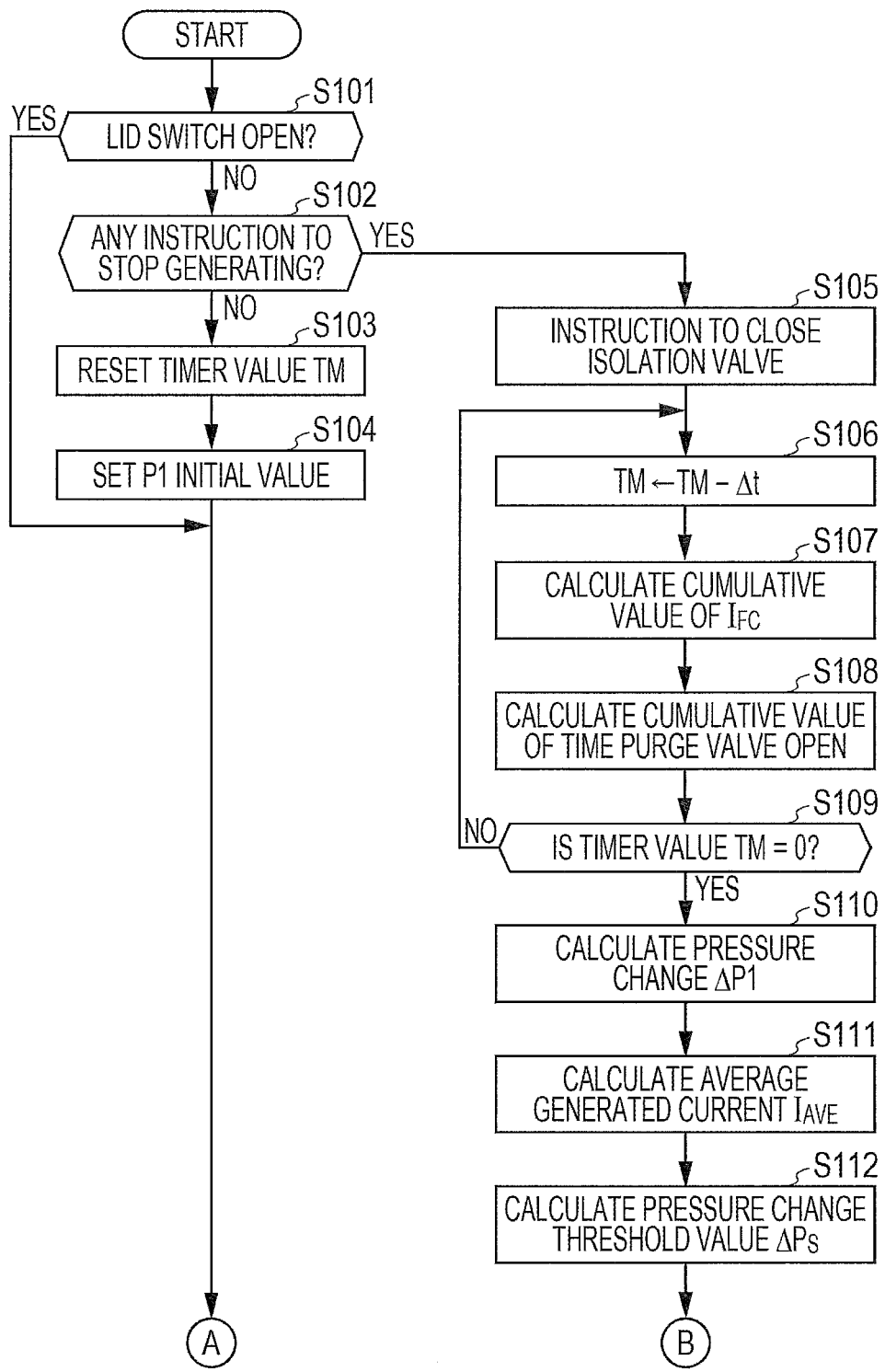
FIG. 2 is a flowchart illustrating an operation flow when executing a processing to determine open valve malfunctions in a shutoff valve.
Figure 3:
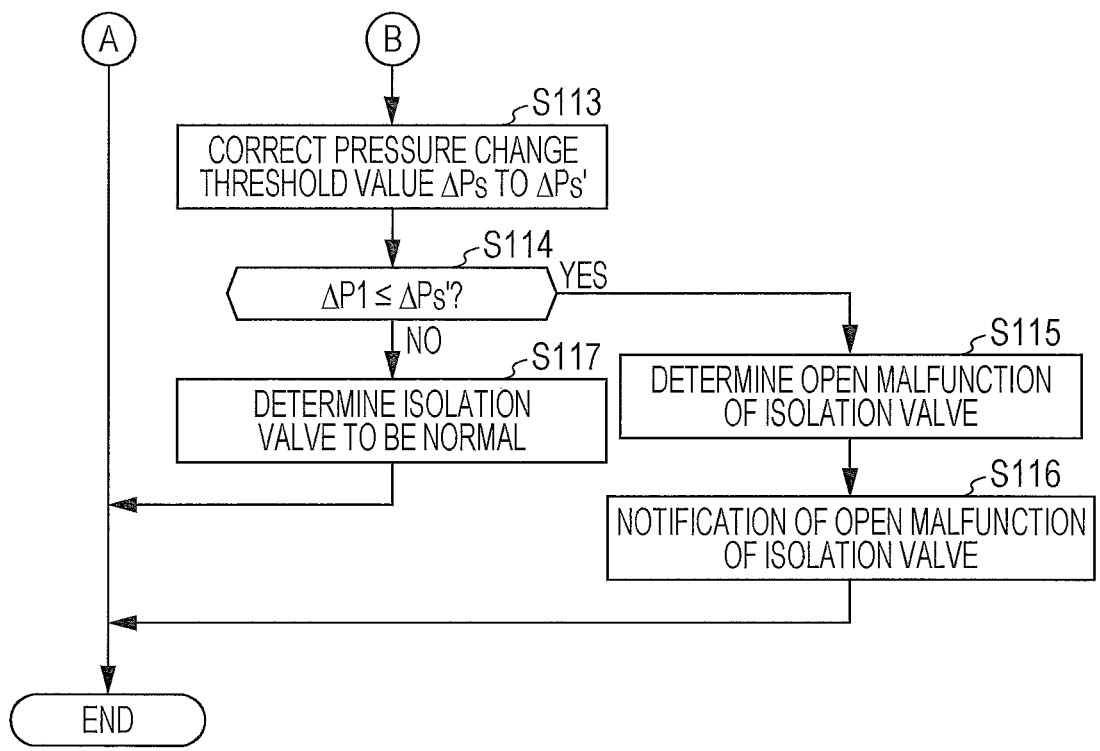
FIG. 3 is a flowchart illustrating an operation flow when executing a processing to determine open valve malfunctions in a shutoff valve.

FIGS. 2 and 3 are flowcharts illustrating an operation flow when executing the processing to determine open valve malfunctions in the shutoff valve.

During a step S101, the ECU 13 determines whether or not an open instruction for the fuel lid 4 is input from the lid switch 14. When the open instruction for the fuel lid 4 is input from the lid switch 14 (Yes in S101), the ECU 13 terminates the processing without executing the processing to determine open valve malfunctions in the shutoff valve 3.

As previously described, the shared flow channel a2 (refer to FIG. 1) shared for both the filling and supply of hydrogen is provisioned to the fluid supply system S, and enables the flow of hydrogen through the fluid fill channel (pipe a1) and the fluid supply channel (pipes a3 through a5) via the shared flow channel a2. Theoretically, if the ECU 13 executes the processing to determine open valve malfunctions while the tank is being filled with hydrogen from the fill hole 5, there is a potential that an open valve malfunction will be falsely detected when there is no open valve malfunction in the shutoff valve 3. This is because the hydrogen supplied via the fluid fill channel flows into the fluid supply channel even though the shutoff valve 3 is closed, which results in the pressure detected by the primary pressure sensor 10, for example, to be relatively high.

According to the present embodiment, when the open signal is input from the lid switch 14, the ECU 13 stops (prohibits) the processing to determine open valve malfunctions. Therefore, this may avoid the filling of the tank with hydrogen and the processing to determine open valve malfunctions from occurring simultaneously and also may reliably prevent false detections of open valve malfunctions in the shutoff valve 3.

Returning to FIG. 2, the description of the operation will continue. When the open instruction for the fuel lid 4 is not input from the lid switch 14 during the step S101 (No in S101), the processing by the ECU 13 proceeds to a step S102.

During the step S102, the ECU 13 determines whether or not a stop power generation instruction is input, that is to say, whether or not the off signal is input from the IG 15. When the stop power generation instruction is input (Yes in S102), the processing by the ECU 13 proceeds to a step S105. Conversely, when the stop power generation instruction is not input (No in S102), the processing by the ECU 13 proceeds to a step S103.

During the step S103, the ECU 13 resets a timer value TM. The timer value TM is used to calculate an average generated current $I_{AVE}$ (refer to S111) during the next processing to determine open valve malfunctions.

During the step S104, the ECU 13 sets the detection value detected by the primary pressure sensor 10 as an initial value P1 and terminates the series of processing. The initial value P1 is used to execute the next processing to determine open valve malfunctions.

The series of processing regarding steps S105 through S117 illustrated in FIGS. 2 and 3 correspond to the processing to determine open valve malfunctions to determine whether or not there is an open valve malfunction in the shutoff valve 3.

During the step S105 illustrated in FIG. 2, the ECU 13 outputs a close valve instruction to the shutoff valve 3. At this timing, it is not clear whether the shutoff valve 3 is actually closed or is experiencing an open valve malfunction.

The primary reducing valve 7 including the cutoff function is open at least until the timer value TM is equal to zero (refer to S109), and the fuel cell 1 continues to be in state in which electric power may be generated. Therefore, in the event of an open malfunction of the shutoff valve 3, hydrogen continues to be supplied to the anode flow channel 1a through the pipes a3 through a5 and so on. As a result, the hydrogen pressure in the pipe a3, for example, does not decrease.

Returning to FIG. 2, the description of the operation will continue. During the step S106, the ECU 13 subtracts a predetermined value Δt from the timer value TM, and updates the timer value TM with this new value (TM−Δt). Note that the timer value set at the time of the previous reset (refer to S103) is used as the initial timer value TM.

During a step S107, the ECU 13 calculates a cumulative value for a current $I_{FC}$. The current $I_{FC}$ is used for the detection value from the current sensor (not illustrated) which detects the generated current from the fuel cell 1, for example.

During a step S108, the ECU 13 calculates a cumulative value of time that the purge valve (not illustrated) is open. The cumulative value of time that the purge valve is open is obtained by calculating the total time that the open instruction is output to the purge valve from the ECU 13 after the stop power generation instruction from the step S102 is input. The cumulative value of time that the purge valve is open is used to perform corrections of a pressure change threshold value $\Delta P_S$ described later (refer to step S113 in FIG. 3).

During the step S109, the ECU 13 determines whether or not the timer value TM is equal to zero. When the timer value TM is equal to zero (Yes in S109), the processing by the ECU 13 proceeds to a step S110. Conversely, the timer value TM is not equal to zero (No in S109), the processing by the ECU 13 returns to the step S106.

During the step S110, the ECU 13 calculates a pressure change ΔP1. The pressure change ΔP1 is obtained by subtracting the detection value input form the primary pressure sensor 10 at this timing from the initial value P1 previously set (refer to S104).

During a step S111, the ECU 13 calculates the average generated current $I_{AVE}$. The average generated current $I_{AVE}$ is obtained by dividing the cumulative value of the current $I_{FC}$ with a value obtained by dividing the timer value TM by a control cycle when executing the series of processing repeatedly.

During a step S112, the ECU 13 calculates the pressure change threshold value $\Delta P_S$. The relationship between the previously described average generated current $I_{AVE}$ and the pressure change threshold value $\Delta P_S$ is stored as a table beforehand in a storage unit (not illustrated), for example. The ECU 13 searches the table and extracts the pressure change threshold value $\Delta P_S$ corresponding with the average generated current $I_{AVE}$ calculated during the step S111.

Next, during the step S113 in FIG. 3, the ECU 13 calculates a corrected value $\Delta P_S'$ of the pressure change threshold value $\Delta P_S$. That is to say, the ECU 13 adds a value, which is obtained by multiplying the cumulative value of time that the purge valve (not illustrated) is open calculated during the step S112 with a predetermined coefficient, to the pressure change threshold value $\Delta P_S$, and this value is set as the corrected value $\Delta P_S'$ of the pressure change threshold value $\Delta P_S$. This is performed because the pressure of the fluid supply channel decreases when the purge valve opens.

During a step S114, the ECU 13 determines whether or not the pressure change ΔP1 calculated at the step S110 is the same or less than the corrected value $\Delta P_S'$ of the pressure change threshold value $\Delta P_S$ calculated at the step S113.

Theoretically, when the shutoff valve 3 closes normally in accordance with the close valve instruction from the ECU 13, the hydrogen downstream from the shutoff valve 3 is consumed by the fuel cell 1, and so the pressure detected by the primary pressure sensor 10 decreases, for example. Conversely, when the shutoff valve 3 is experiencing an open valve malfunction, the portion of hydrogen consumed by the fuel cell 1 is supplied from the hydrogen storage tank 2, and so the rate of the decrease in pressure detected by the primary pressure sensor 10 slows.

Therefore, when the pressure change ΔP1 is the same or less than the corrected value $\Delta P_S'$ of the pressure change threshold value $\Delta P_S$ (Yes in S114), that is to say, when the rate of the decrease in pressure detected by the primary pressure sensor 10 slows, the processing by the ECU 13 proceeds to a step S115. During the step S115, the ECU 13 determines that there is an open valve malfunction in the shutoff valve 3. Next, during a step S116, the ECU 13 notifies the driver by a display lamp or the like that there is an open valve malfunction in the shutoff valve 3, and the series of processing terminates.

Conversely, in step S114, when the pressure change ΔP1 is more than the corrected value $\Delta P_S'$ of the pressure change threshold value $\Delta P_S$ (No in S114), that is to say, when the rate of the decrease in pressure detected by the primary pressure sensor 10 is fast, the processing by the ECU 13 proceeds to the step S117. During the step S117, the ECU 13 determines that the shutoff valve 3 in a normal state, and the series of processing terminates.

Though not illustrated in the flowcharts in FIGS. 2 and 3, when the stop power generation instruction is input (Yes in S102) at a state in which the fuel lid 4 is closed (No in S101), the ECU 13 monitors the operation signal from the lid switch 14 once per predetermined cycle time. Then when the open operation signal is input, the ECU 13 executes an interrupt processing during the steps S105 through S117, which terminates the processing to determine open valve malfunctions in the shutoff valve 3.

As a result, false detections of open valve malfunctions in the shutoff valve 3 may be reliably avoided for cases in which the tank is filled with hydrogen gas after there has been a stop power generation instruction.

The processing of the steps S101 through S117 is repeatedly executed once each predetermined control cycle.

Advantages

According to the fluid supply system S related to the present embodiment, when the open instruction is input from the lid switch 14 to the fuel lid 4, the ECU 13 stops the processing to determine open valve malfunctions (prohibits or terminates). As a result, this may prevent the filling of the tank with hydrogen and the processing to determine open valve malfunctions from occurring simultaneously. Therefore, false determinations of open valve malfunctions when the shutoff valve 3 is not experiencing an open valve malfunction may also be reliably prevented.

Theoretically, if the filling of the tank with hydrogen and the processing to determine open valve malfunctions are executed simultaneously, hydrogen flowing through the fuel gas fill channel also flows through the fuel gas supply channel, and so the hydrogen pressure detected by the primary pressure sensor 10 does not decrease. As a result, it is likely that open valve malfunctions will be falsely detected even though the shutoff valve 3 has closed normally after receiving the close valve instruction.

According to the present embodiment in contrast to this, false detections of open valve malfunctions in the shutoff valve 3 when in a closed state may be reliably prevented, and unnecessary stoppages of the fluid supply system S may be avoided. As a result, causing unnecessary action to be performed by the user may be prevented, and the perceived reliability of the system may be improved.

Second Embodiment

The difference between the first Embodiment and a second Embodiment is the execution of the processing of a step S101a in addition to the processing of the step S101 (refer to FIG. 2). All other processing is similar to that of the first Embodiment. The configuration of the fluid supply system S according to the second Embodiment is similar to that of the first Embodiment (refer to FIG. 1).

Therefore, only the difference with the first Embodiment will be described, and so the description of the aspects that are similar will be omitted.

Operation of the Fluid Supply System

Figure 4:
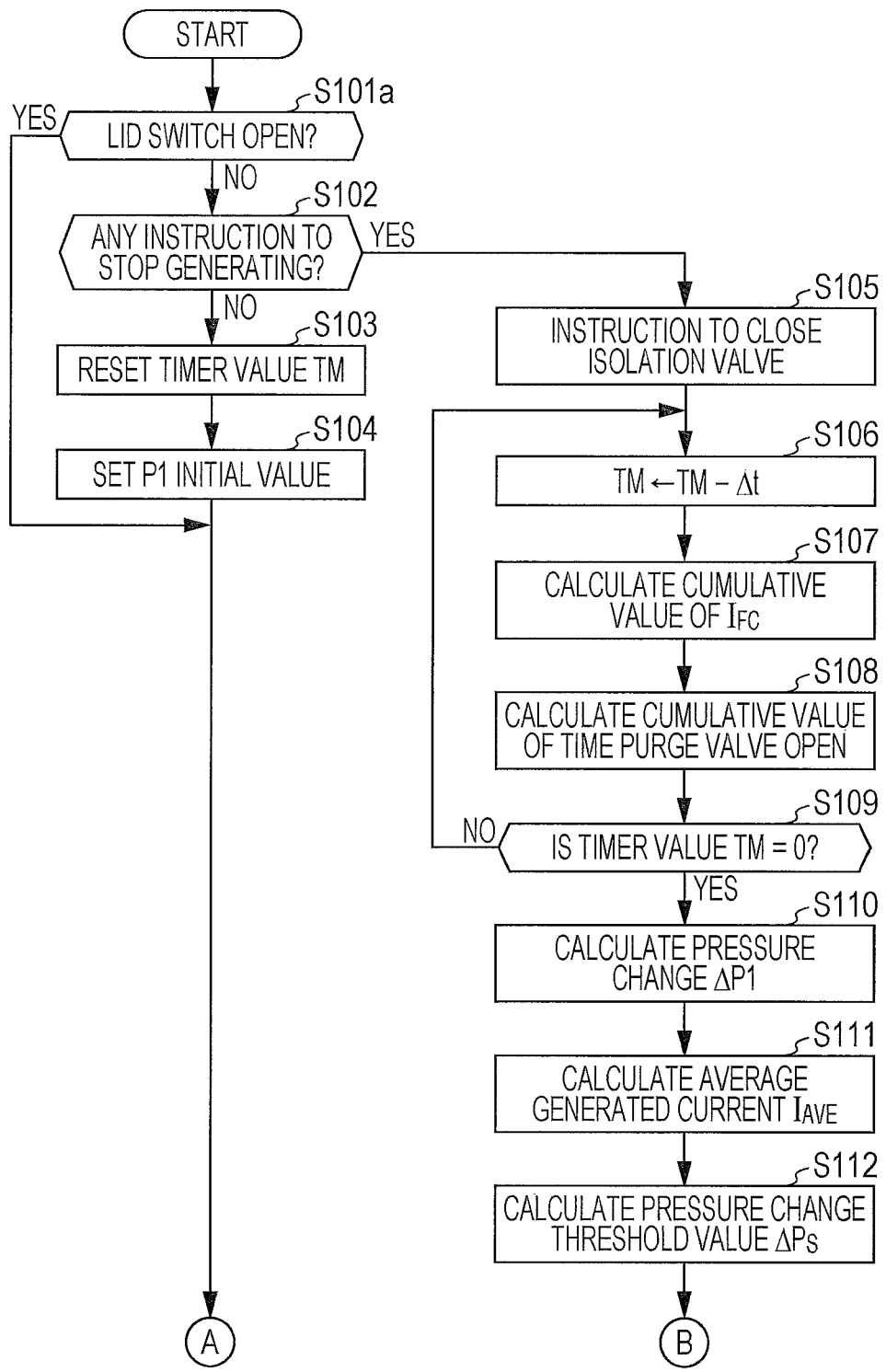
FIG. 4 is a flowchart illustrating an operation flow when executing a processing to determine open valve malfunctions in a shutoff valve regarding a fluid supply system related to a second Embodiment of the present technology.
Figure 5:
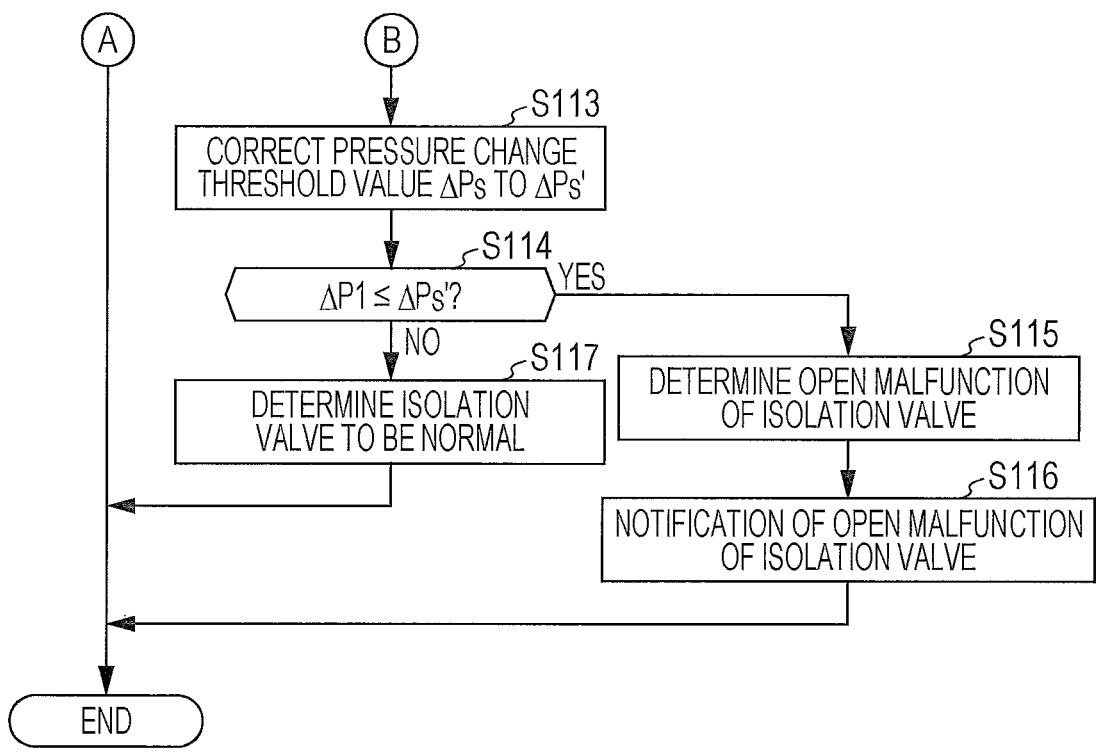
FIG. 5 is a flow chart illustrating an operation flow when executing a processing to determine open valve malfunctions in a shutoff valve.

FIGS. 4 and 5 are flowcharts illustrating an operation flow when executing the processing to determine open valve malfunctions in the shutoff valve regarding the fluid supply system related to the present embodiment.

During the step S101a in FIG. 4, the ECU 13 determines whether or not a fill communication signal is input. As previously described, when the tank is filled with hydrogen and the communication connector 204 is connected to the interface 6, fill communication starts between the dispenser 202 and the ECU 13.

When the fill communication signal is input (Yes in S101a), the processing by the ECU 13 terminates. The tank is being filled (resupplied) with hydrogen when the fill communication is occurring, except when the hydrogen pressure in the hydrogen storage tank 2 is at least a predetermined value (that is to say, the state when the tank is full). When the fill communication is occurring in this way, the ECU 13 prohibits (stops) the processing to determine open valve malfunctions in the shutoff valve 3 to reliably prevent the false detection of the open valve malfunction.

When the fill communication signal is not input during the step S101a (No in S101a), the processing by the ECU 13 proceeds to the step S102. The processing of the steps S102 through S117 is similar to the steps S102 through S117 described for the first Embodiment, and so their descriptions are omitted.

Though not illustrated in flowcharts in FIGS. 4 and 5, when there is the stop power generation instruction (Yes in S102) at a state in which the fill communication signal is not input (No in S101a), the ECU 13 monitors whether or not the fill communication signal is input once each predetermined cycle time. Then, when the fill communication signal is input, the ECU 13 executes the interrupt processing during the processing of the steps S105 through S117 to stop the processing to determine open valve malfunctions in the shutoff valve 3.

As a result, false detections of open valve malfunctions in the shutoff valve 3 may be reliably avoided when the tank is filled with hydrogen gas after the stop power generation instruction has been output.

Advantages

According to the fluid supply system S related to the present embodiment, when the fill communication signal is input, the ECU 13 does not execute (or terminates) the processing to determine open valve malfunctions. Therefore, similar to the first Embodiment, false determinations of open valve malfunctions when the shutoff valve 3 is not experiencing an open valve malfunction may be reliably prevented.

The opening of the fuel lid 4 does not necessarily indicate that the tank will be filled with hydrogen (for example, a case in which the user accidentally leaves the fuel lid 4 open). In contrast, the likelihood that the tank will be filled with hydrogen is significantly high when the fill communication as this only occurs after the communication connector 204 is connected to the interface 6.

Therefore, according to the present Embodiment, false detections of open valve malfunctions in the shutoff valve 3 may be reliably prevented while also significantly reducing unnecessary terminations of the processing to determine open valve malfunctions.

Third Embodiment

The difference between the first Embodiment and a third Embodiment is the removal of the processing of the step S101 (refer to FIG. 2) and the addition the processing of a step S121 in between the step S110 and the step S111. All other processing is similar to that of the first Embodiment. The configuration of the fluid supply system S according to the third Embodiment is similar to that of the first Embodiment (refer to FIG. 1).

Therefore, only the difference with the first Embodiment will be described, and so the description of the aspects that are similar will be omitted.

Figure 6:
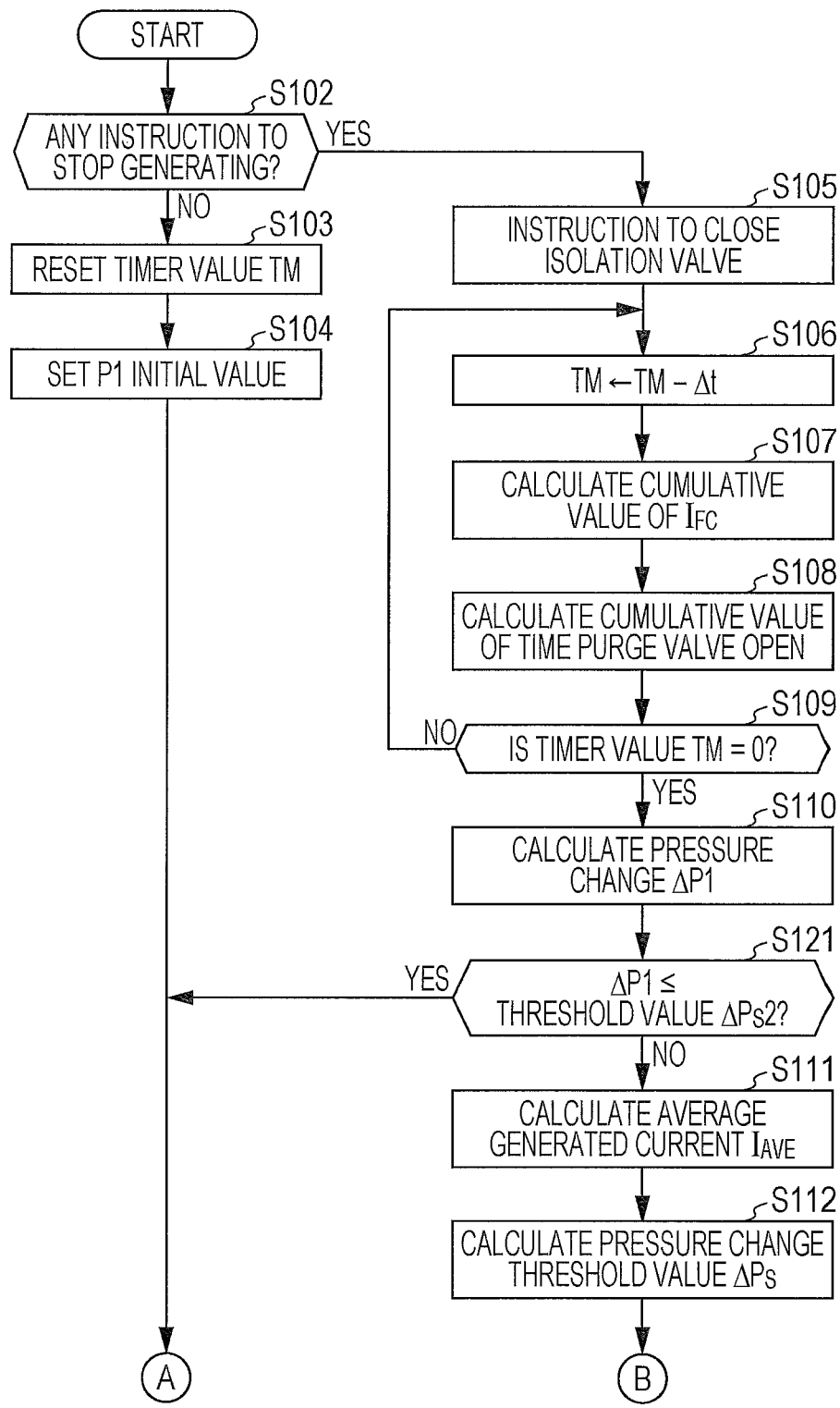
FIG. 6 is a flowchart illustrating an operation flow when executing a processing to determine open valve malfunctions in a shutoff valve regarding a fluid supply system related to a third Embodiment of the present technology.
Figure 7:
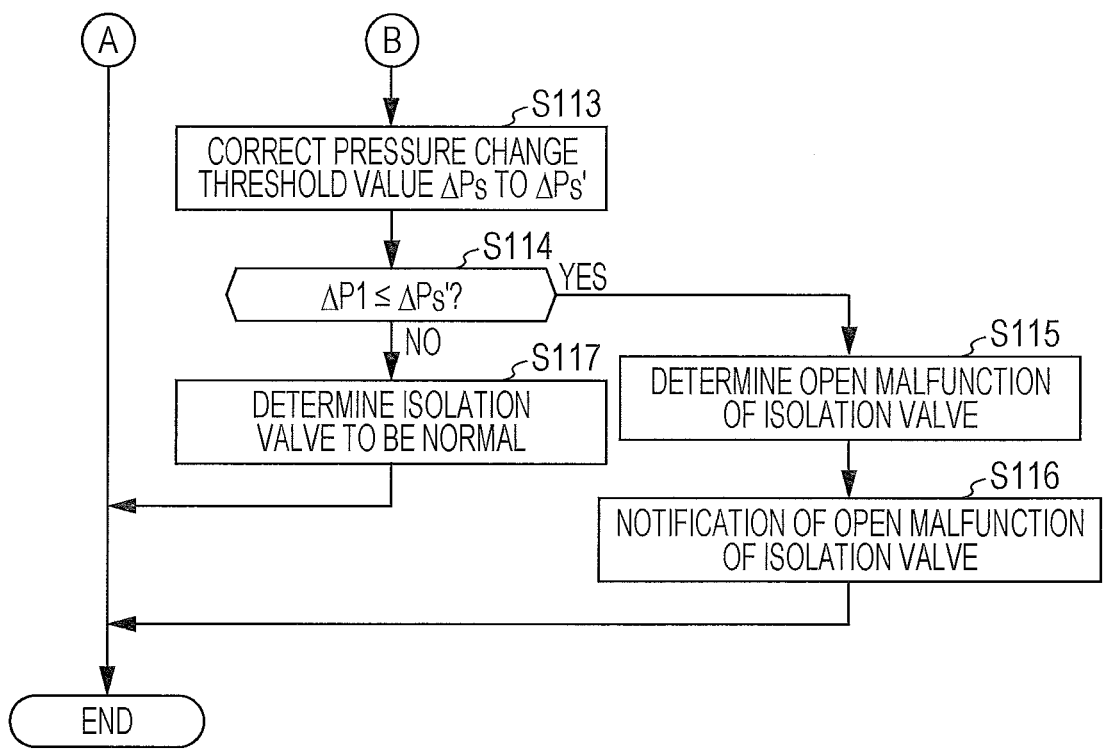
FIG. 7 is a flowchart illustrating an operation flow when executing a processing to determine open valve malfunctions in a shutoff valve.

FIGS. 6 and 7 are flowcharts illustrating an operation flow when executing the processing to determine open valve malfunctions in the shutoff valve regarding the fluid supply system related to the present embodiment.

As previously described, according to the present embodiment, the determination of whether or not the lid switch is open during the step S101 in FIG. 2 is not executed, and the processing starts from the step S102. The steps S102 through S109 are similar to the steps S102 through S109 described for the first Embodiment, and so their descriptions are omitted.

During the step S121 in FIG. 6, the ECU 13 determines whether or not the pressure change $\Delta P1$ is the same or less than the predetermined threshold value $\Delta P_S 2$. As described for the first Embodiment, the pressure change $\Delta P1$ is the value obtained by subtracting the initial value P1 from the detection value for the primary pressure sensor 10 at this timing.

The threshold value $\Delta P_S 2$ is previously set to enable reliable determinations of whether or not the hydrogen storage tank 2 is being filled with hydrogen at a state in which the close instruction is input into the normally closed shutoff valve 3, and the threshold value $\Delta P_S 2$ is stored in the storage unit (not illustrated).

When the pressure change $\Delta P1$ is the same or less than the predetermined threshold value $\Delta P_S2$ (Yes in S121), the likelihood that the tank is being filled with hydrogen is high. Therefore in this case, the ECU 13 terminates the processing to determine open valve malfunctions continuing from the step S105 until the step S110, and then the processing terminates.

Conversely, when the pressure change $\Delta P1$ is higher than the predetermined threshold value $\Delta P_S2$ (No in S121), the processing by the ECU 13 proceeds to the step S111.

The processing of the steps S110 through S117 is similar to the steps S110 through S117 described for the first Embodiment, and so their descriptions are omitted.

Advantages

According to the fluid supply system S related to the present embodiment, the ECU 13 terminates the processing to determine open valve malfunctions when the pressure change $\Delta P1$ of the hydrogen pressure detected by the primary pressure sensor 10 is the same or less than the threshold value $\Delta P_S2$ (Yes in S121). The threshold value $\Delta P_S2$ is set to a value that enables the reliable detection of when the tank is being filled with hydrogen. Therefore, the execution of the processing to determine open valve malfunctions at the same time as the filling of the tank with hydrogen is avoided, which enables false determinations of open valve malfunctions when the shutoff valve 3 is not experiencing an open valve malfunction to be reliably prevented.

Fourth Embodiment

The difference between the first Embodiment and a fourth Embodiment is the removal of the processing of the step S101 (refer to FIG. 2) and the addition the processing of steps S131 through S133. All other processing is similar to that of the first Embodiment. The configuration of the fluid supply system S according to the fourth Embodiment is different in that in addition to the configuration illustrated in FIG. 1, a temperature sensor (temperature detection unit) is provisioned to detect the temperature inside the hydrogen storage tank 2. All other parts are similar to that of the first Embodiment.

Therefore, only the difference with the first Embodiment will be described, and so the description of the aspects that are similar will be omitted.

Figure 8:
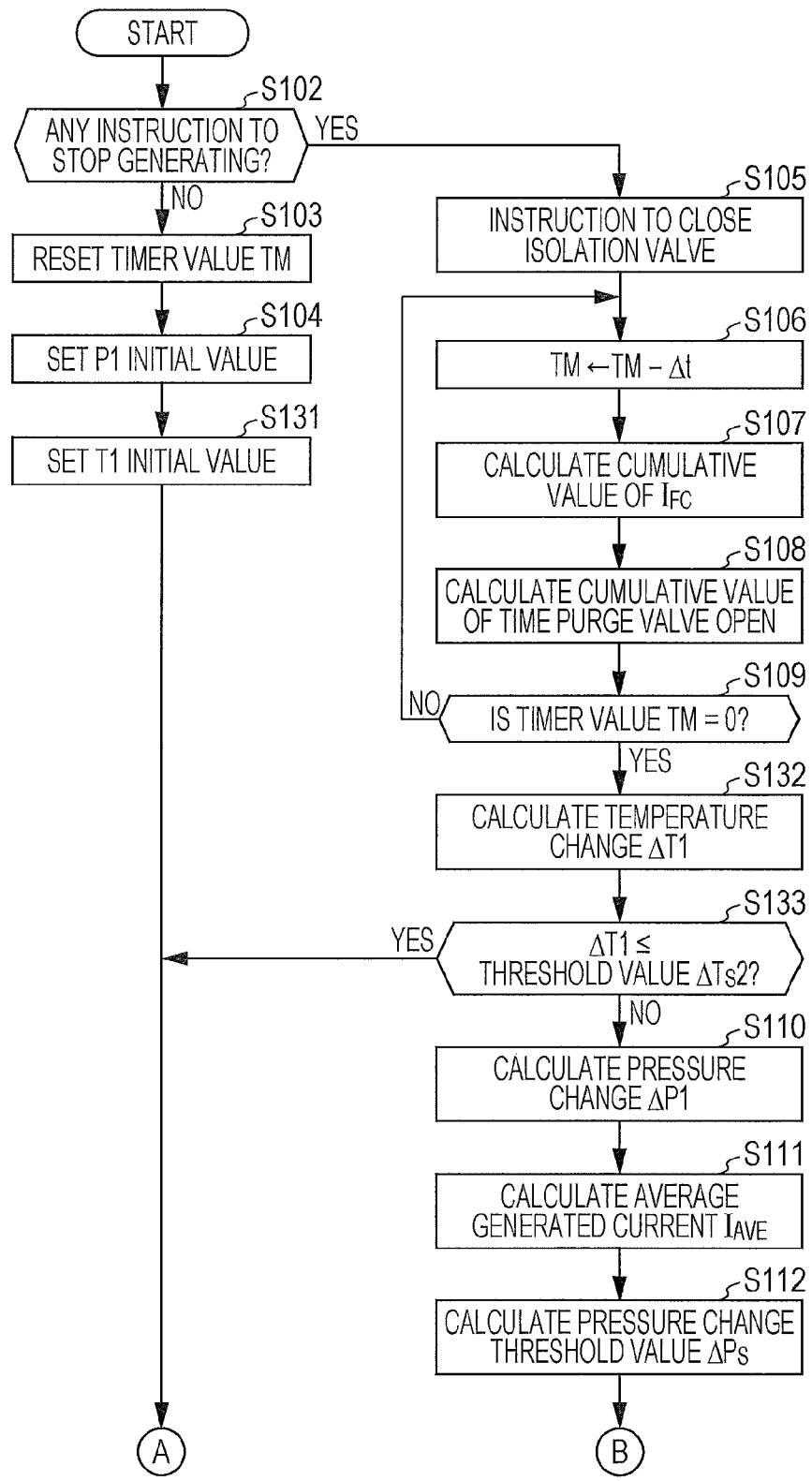
FIG. 8 is a flowchart illustrating an operation flow when executing a processing to determine open valve malfunctions in a shutoff valve regarding a fluid supply system related to a fourth Embodiment of the present technology.
Figure 9:
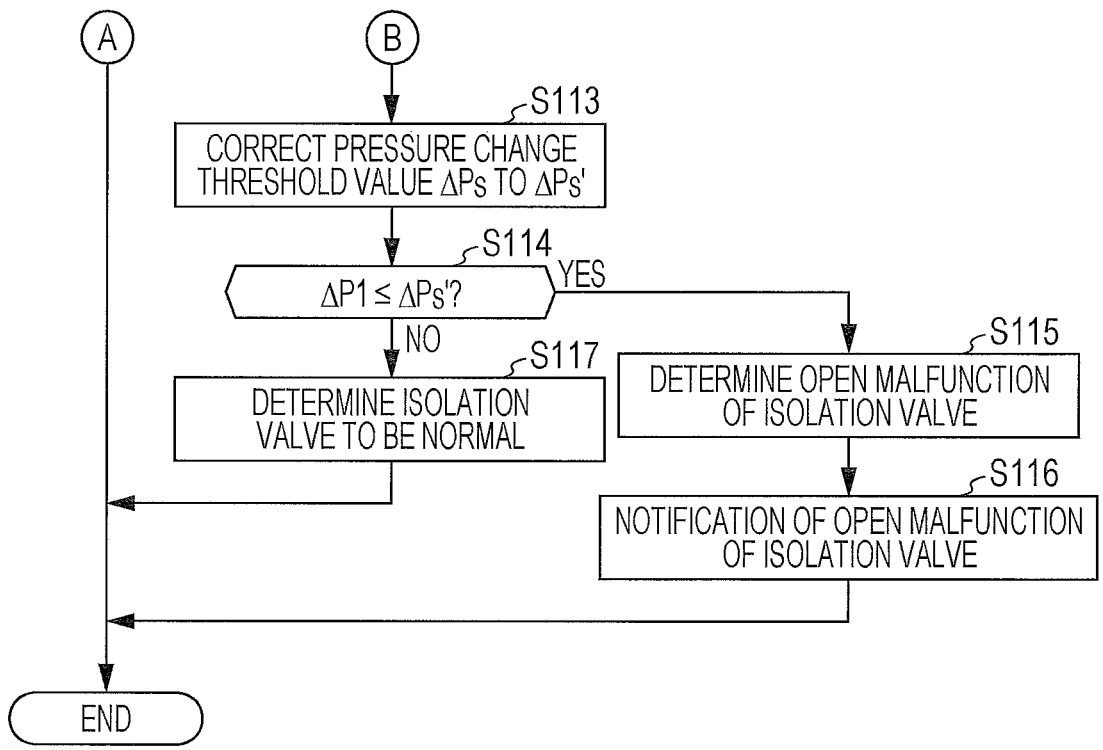
FIG. 9 is a flowchart illustrating an operation flow when executing a processing to determine open valve malfunctions in a shutoff valve.

FIGS. 8 and 9 are flowcharts illustrating an operation flow when executing the processing to determine open valve malfunctions in the shutoff valve regarding the fluid supply system related to the present embodiment.

As previously described, according to the present embodiment, the determination of whether or not the lid switch is open during the step S101 in FIG. 2 is not executed, and the processing starts from the step S102. The steps S102 through S104 are similar to the steps S102 through S104 described for the first Embodiment, and so their descriptions are omitted.

After the processing of the step S104 finishes and proceeds to the step S131, the ECU 13 sets an initial value T1. The initial value T1 is used when executing the next processing to determine open valve malfunctions.

During the step S132 in FIG. 8, the ECU 13 calculates a temperature change $\Delta T1$. The temperature change $\Delta T1$ is the value obtained by subtracting the detection value for the temperature sensor (temperature sensor installed in the hydrogen storage tank 2) at this timing from the initial value T1. The shutoff valve 3 opens even in the state in which the close instruction is input (refer to S105) when hydrogen at high pressure flows through the fluid fill channel, due to this pressure of hydrogen. The internal pressure and temperature of the hydrogen storage tank 2 increases as the tank is filled with hydrogen. In this case, the temperature change $\Delta T1$ is a negative value.

During the step S133, the ECU 13 determines whether or not the temperature change $\Delta T1$ is the same or less than a predetermined threshold value $\Delta T_S2$. The threshold value $\Delta T_S2$ is set to enable reliable determination on whether or not the tank is being filled with hydrogen during the state in which the close instruction is input into the normally closed shutoff valve 3, and the threshold value $\Delta T_S2$ is previously stored in the storage unit (not illustrated).

When the temperature change $\Delta T1$ is the same or less than the threshold value $\Delta T_S2$ (Yes in S133), the likelihood that the tank is being filled with hydrogen is high. Therefore in this case, the ECU 13 terminates the processing to determine open valve malfunctions continuing from the step S105 through the step S109, and the processing terminates. Conversely, when the temperature change $\Delta T1$ is more than the threshold value $\Delta T_S2$ (No in S133), the processing by the ECU 13 proceeds to the step S110.

The processing of the steps S110 through S117 is similar to the steps S110 through S117 described for the first Embodiment, and so their descriptions are omitted.

Advantages

According to the fluid supply system S related to the present embodiment, the ECU 13 terminates the processing to determine open valve malfunctions when the temperature change $\Delta T1$ regarding the inside of the hydrogen storage tank 2 detected by the temperature sensor (not illustrated) is the same or less than the threshold value $\Delta T_S2$ (Yes in S133). The threshold value $\Delta T_S2$ is set to a value that enables the reliable detection of when the tank is being filled with hydrogen.

Therefore, the execution of the processing to determine open valve malfunctions at the same time as the filling of the tank with hydrogen is avoided, which enables false detections of open valve malfunctions when the shutoff valve 3 is not experiencing an open valve malfunction to be reliably prevented.

Modification

This concludes the description of the fluid supply system S related to the present technology as exemplified by the embodiments, but the embodiments of the present technology are not limited to the descriptions here, and so various modifications may be performed.

For example, a sensor may be provisioned to detect when the nozzle 203 is inserted into the fill hole 5, and when the sensor detects that the nozzle 203 has been inserted, the ECU 13 may stop (prohibit or terminate) the processing to determine open valve malfunctions in the shutoff valve 3.

According to the embodiments, the examples described a case in which the open instruction signal is electrically output to the ECU 13 when the lid switch 14 is depressed, but the present technology is not limited thusly. For example, a mechanical transfer system may be used to connect a fuel lid opener (not illustrated) and a release lever under the driver's seat (not illustrated) by a wire cable (not illustrated). In this case, the ECU 13 stops (prohibits or terminates) the processing to determine open valve malfunctions in the shutoff valve 3 when the open signal is input from the fuel lid opener.

According to embodiments, the examples described a case in which the occurrence of the open valve malfunction is determined using the detection value from the primary pressure sensor 10, but the detection value from the secondary pressure sensor 11 may also be used in addition to the detection value from the primary pressure sensor 10. According to the fourth Embodiment, the determination of whether or not the tank is being filled with hydrogen uses the detection value from the primary pressure sensor 10, but the present technology is not limited thusly. For example, the determination on whether or not the tank is being filled with hydrogen may use the detection value from a pressure sensor provisioned in the hydrogen storage tank 2.

The embodiments may also be combined. That is to say, the ECU 13 may use any one or more of the fill communication signal input externally, the open signal from the fuel lid 4 provisioned for the fill hole 5, the pressure information input from the primary pressure sensor 10 or other, and the temperature information input from the temperature detection unit for detecting the temperature inside the hydrogen storage tank 2 to detect when the tank is being filled with hydrogen.

High pressure is also applied to the fluid supply channel (pipe a4 or other, refer to FIG. 1) when performing an airproof check of the hydrogen storage tank 2 during maintenance of the fuel cell vehicle 100. Therefore, it is preferable to stop the processing to determine open valve malfunctions in the shutoff valve 3 during maintenance. The flow of processing by the ECU 13 in this case is similar to that described for the embodiments, and so this description is omitted.

According to the embodiments, the examples described a case in which the fluid usage device is the fuel cell 1 which generates electric power from the supply of hydrogen or some other fluid, but the present technology is not limited thusly. For example, the fluid usage device may be any of various devices using high pressure fluids such as machine tools used to perform Work using high pressure fluids supplied from a tank.

FIG. 1 illustrates a case in which the fuel cell vehicle 100 receives the supply of hydrogen from the hydrogen station 200, but the present technology is not limited thusly. For example, the present technology may also be applied to a case in which hydrogen is supplied from a tank truck having a hydrogen storage tank 2 to the hydrogen storage tank 2 provisioned in a factory or similar.

The previous description described a case in which hydrogen is used as the fuel gas, but the present technology may be applied to a case in which natural gas or other is used as the fuel gas. A hydrogen engine system may also be used as the device that uses the fuel gas, for example.

A fluid supply system according to the embodiment is provisioned with a tank configured to store a fluid that changes in volume under pressure, a shutoff valve provisioned in a port in the tank, the shutoff valve formed with a shared channel to enable fluid to flow for both the filling of the tank with fluid from a fill hole and supply of fluid from the tank to a fluid usage unit, a fluid fill channel in which one end is connected to the shared channel and the other end is connected to the fill hole, a fluid supply channel in which one end is connected to the shared channel and the other end is connected to the fluid usage unit, a fill detection unit configured to detect when the tank is being filled with fluid via the fluid fill channel, a pressure detection unit provisioned in the fluid supply channel, and a control unit configured to output a close instruction to the shutoff valve and execute a processing to determine open valve malfunctions in the shutoff valve on the basis of changes in pressure values input from the pressure detection unit, wherein the control unit stops the processing to determine open valve malfunctions when there is a detection by the fill detection unit that the tank is being filled with fluid.

According to this configuration of the embodiment, shared channel is formed in the shutoff valve to enable fluid to flow for both the filling of the tank with fluid from a fill hole and supply of fluid from the tank to a fluid usage unit. As a result, the pressure of the fluid is also applied to the fluid supply channel through the shared channel when there is detection by the fill detection unit that the tank is being filled with fluid via the fluid fill channel.

Hypothetically, there is a potential for false determinations of the open valve malfunction due to the pressure applied to the fluid supply channel when the control unit executes the processing to determine open valve malfunctions at a state in which there is a detection by the fill detection unit that the tank is being filled with fluid.

In contrast, according to the embodiment, the control unit stops the processing to determine open valve malfunctions when there is a detection by the fill detection unit that the tank is being filled with fluid. Therefore, the detection of an open valve malfunction when the shutoff valve is in a normal state may be prevented.

Also, the control unit according to the embodiment may prohibit the processing to determine open valve malfunctions when there is a detection by the fill detection unit that the tank is being filled with fluid.

According to this configuration of the embodiment, the control unit prohibits (stops) the processing to determine open valve malfunctions when there is a detection by the fill detection unit that the tank is being filled with fluid. That is to say, when there is a detection that the tank is being filled with fluid before the control unit starts the processing to determine open valve malfunctions, the execution of the processing to determine open valve malfunctions is prohibited beforehand, which may avoid the filling of the tank with fluid and the processing to determine open valve malfunctions from occurring simultaneously. Therefore, false detections of open valve malfunctions in the shutoff valve may be prevented.

Also, the control unit according to the embodiment may terminate the processing to determine open valve malfunctions when there is a detection by the fill detection unit that the tank is being filled with fluid during the execution of the processing to determine open valve malfunctions.

According to this configuration of the embodiment, the processing to determine open valve malfunctions is terminated (stopped) by the control unit when there is a detection by the fill detection unit that the tank is being filled with fluid during the execution of the processing to determine open valve malfunctions. Therefore, the filling of the tank with fluid and the execution of the processing to determine open valve malfunctions occurring simultaneously may be avoided, which enables false determinations of open valve malfunctions in the shutoff valve to be prevented.

Also, the fill detection unit according to the embodiment may detect that the tank is being filled with fluid using any one or more of a fill communication signal input externally, an open signal regarding a lid member provisioned for the fill hole, pressure information input from the pressure detection unit, and temperature information input from a temperature detection unit configured to detect the temperature inside the tank.

According to this configuration of the embodiment, the fill detection unit may reliably detect that the tank is being filled with fluid in response to the input of the fill communication signal input externally, the open signal regarding the lid member provisioned for the fill hole, or other. There is also a correspondence between the fill amount of fluid in the tank, the pressure in the tank, and the temperature in the tank. Therefore, the fill detection unit may reliably detect that the tank is being filled with fluid on the basis of pressure information input from the pressure detection unit or temperature information input form the temperature detection unit.

The fill detection unit according to the embodiment may detect that the tank is being filled with fluid using any combination of the previously described signals and information.

According to the embodiment, a fluid supply system is provided that is capable of preventing false detections of open valve malfunctions in the shutoff valve.

Obviously, numerous modifications and variations of the present invention are possible in light of the above teachings. It is therefore to be understood that within the scope of the appended claims, the invention may be practiced otherwise than as specifically described herein.

What is claimed is:

1. A fluid supply system comprising:
   a tank to store a fluid, the fluid being changeable in volume in accordance with a change in pressure;
   a shutoff valve provided in a port of the tank, the shutoff valve including a shared channel to enable fluid to flow from a fill hole to the tank and to flow from the tank to a fluid usage device;
   a fluid fill channel including one end connected to the shared channel and another end connected to the fill hole;
   a fluid supply channel including one end connected to the shared channel and another end connected to the fluid usage device;
   a fill detector configured to detect that the fluid supply system is in a supplying state in which fluid is to be supplied to the tank via the fluid fill channel;
   a pressure detector provided in the fluid supply channel; and
   a controller configured to output a close instruction to the shutoff valve and configured to execute a processing to determine open valve malfunctions in the shutoff valve based on changes in pressure values which are input from the pressure detector, the controller stopping the processing to determine open valve malfunctions when the fill detector detects that the fluid supply system is in the supplying state.

2. The fluid supply system according to claim 1, wherein the controller prohibits the processing to determine open valve malfunctions when the fill detector detects that the fluid supply system is in the supplying state.

3. The fluid supply system according to claim 1, wherein the controller terminates the processing to determine open valve malfunctions when the fill detector detects that the fluid supply system is in the supplying state during an execution of the processing to determine open valve malfunctions.

4. The fluid supply system according to claim 1, wherein the fill detector detects that the fluid supply system is in the supplying state using at least one of
   a fill communication signal which is input externally,
   an open signal regarding a lid member provided to correspond to the fill hole,
   pressure information which is input from the pressure detector, and
   temperature information which is input from a temperature detector configured to detect a temperature inside the tank.

* * * * *